United States Patent
Lumpkin

(10) Patent No.: US 10,343,743 B2
(45) Date of Patent: Jul. 9, 2019

(54) HYDRAULIC BICYCLE DISC BRAKE HAVING TWIN DISCRETE FLUID CIRCUITS TO OPPOSING CYLINDERS OF A CALIPER

(71) Applicant: Wayne Lumpkin, Littleton, CO (US)

(72) Inventor: Wayne Lumpkin, Littleton, CO (US)

( * ) Notice: Subject to any disclaimer, the term of this patent is extended or adjusted under 35 U.S.C. 154(b) by 0 days.

(21) Appl. No.: 15/840,915

(22) Filed: Dec. 13, 2017

(65) Prior Publication Data
US 2018/0186426 A1   Jul. 5, 2018

Related U.S. Application Data

(60) Provisional application No. 62/440,839, filed on Dec. 30, 2016.

(51) Int. Cl.
| | |
|---|---|
| *B62L 3/02* | (2006.01) |
| *B62L 1/00* | (2006.01) |
| *F16D 65/18* | (2006.01) |
| *F16D 55/228* | (2006.01) |
| *F16D 125/68* | (2012.01) |
| *F16D 121/04* | (2012.01) |

(52) U.S. Cl.
CPC ............... *B62L 1/005* (2013.01); *B62L 3/023* (2013.01); *F16D 55/228* (2013.01); *F16D 65/18* (2013.01); *F16D 2121/04* (2013.01); *F16D 2125/68* (2013.01)

(58) Field of Classification Search
CPC .... F16D 55/228; F16D 65/18; F16D 2121/04; F16D 2125/68; B62L 1/005; B62L 1/06; B62L 1/10; B62L 3/023
USPC .......................... 188/72.5, 72.6, 24.22, 24.12
See application file for complete search history.

(56) References Cited

U.S. PATENT DOCUMENTS

| | | | |
|---|---|---|---|
| 2,746,575 A | 5/1956 | Kinchin | |
| 3,776,333 A * | 12/1973 | Mathauser | B62L 3/023 188/24.19 |
| 4,175,648 A * | 11/1979 | Sule | B62L 1/10 188/344 |
| 4,391,353 A * | 7/1983 | Mathauser | B62L 1/10 188/24.12 |

(Continued)

FOREIGN PATENT DOCUMENTS

| | | |
|---|---|---|
| DE | 42 16 154 | 10/1993 |
| DE | 195 34 111 | 3/1997 |
| FR | 2 352 216 | 12/1977 |

OTHER PUBLICATIONS

International Search Report from PCT/US17/66185 dated Mar. 6, 2018.

*Primary Examiner* — Thomas W Irvin
(74) *Attorney, Agent, or Firm* — Adsero IP

(57) ABSTRACT

A bicycle hydraulic disc brake having opposing caliper pistons riding in a pair of opposing caliper cylinders. Each caliper piston is configured to advance a brake pad operatively associated therewith into contact with a disc operatively received therebetween upon delivery of pressurized hydraulic fluid to the respective opposing caliper cylinder. A master cylinder is configured, upon actuation, to deliver pressurized hydraulic fluid to the caliper cylinders. An equalizer is provided in fluid communication with the caliper cylinders, the equalizer being configured to provide an equal volume of pressurized hydraulic fluid to each caliper cylinder upon actuation of the master cylinder.

6 Claims, 1 Drawing Sheet

(56) References Cited

U.S. PATENT DOCUMENTS

| | | | | |
|---|---|---|---|---|
| 4,585,094 A | * | 4/1986 | Rottenkolber | B62L 1/10 188/24.22 |
| 4,615,415 A | * | 10/1986 | Mathauser | B62L 3/023 188/24.22 |
| 4,896,753 A | * | 1/1990 | Sule | B62L 1/00 188/24.19 |
| 5,082,093 A | * | 1/1992 | Sule | B62L 1/10 188/24.22 |
| 5,819,886 A | | 10/1998 | Null | |
| 5,950,772 A | | 9/1999 | Buckley | |
| 6,164,421 A | | 12/2000 | Nakamura | |
| 6,220,399 B1 | * | 4/2001 | Phillips | B62L 1/10 188/24.21 |
| 8,783,429 B2 | * | 7/2014 | Moore | B62L 3/023 188/24.22 |
| 9,004,245 B2 | * | 4/2015 | Moore | B60T 11/16 188/2 D |

* cited by examiner

HYDRAULIC BICYCLE DISC BRAKE HAVING TWIN DISCRETE FLUID CIRCUITS TO OPPOSING CYLINDERS OF A CALIPER

RELATED APPLICATIONS

This application claims priority from U.S. Provisional Patent Application Ser. No. 62/440,839, filed Dec. 30, 2016, entitled "Hydraulic Bicycle Disc Brake Having Twin Discrete Fluid Circuits to Opposing Cylinders of a Caliper," which is hereby incorporated by reference.

TECHNICAL FIELD

The present disclosure is directed to a hydraulic bicycle disc brake for a bicycle, and more particularly to a hydraulic bicycle disc brake having a fixed caliper and a flexible rotor.

BACKGROUND

A conventional hydraulic disc brake for a bicycle includes a caliper having a pair of opposing cylinders each receiving a piston having a brake pad operatively associated therewith. The opposing pistons are hydraulically actuated to close upon and squeeze a disc between the opposing brake pads. Typically, both pistons are driven through a single hydraulic hose by a master cylinder. The vast majority of bicycle hydraulic disc brakes include a caliper that is fixedly attached to the bicycle frame and a flexible disc. The disc is flexible to minimize its weight, an important attribute for bicycle components.

It is desired that as the master cylinder is pressurized opposing cylinders of the caliper containing the pistons are pressurized at the same time and an equal volume of hydraulic fluid is provided to each piston so that each piston advances equally to simultaneously bring the associated brake pads into contact with the flexible disc and to also retract equally to provide clearance between the brake pads and the disc with the master cylinder unpressurized. In practice, it is not uncommon for one of the pistons to experience some interference which inhibits advancement of the piston as the master cylinder pressurizes the hydraulic system. While not intending to provide an exhaustive list of the causes of this interference, interference may be caused by the following factors: non-conformity with the tolerances of a seal associated with the piston; non-conformity with the tolerances of the piston; non-conformity with the tolerances of a groove that receives the seal in a caliper cylinder; irregularities in the surface of the piston or the seal resulting in variations in the coefficient of friction therebetween; and contamination such as dirt or grit may invade the surfaces between the piston and the seal. The factors can also combine, resulting in tolerance stack up. Because of "hydraulic cross-over", which is the tendency of a greater volume of hydraulic fluid from the single hydraulic line from the master cylinder to flow to drive a less restricted piston of the caliper piston pair, the less restricted piston will advance more readily than a more restricted piston, which will result in some deflection of the flexible disc by the brake pad associated with the less restricted piston (the "first contacting brake pad") until such time as the more restricted piston overcomes the interference and releases or the first contacting brake pad simply drives the flexible disc into contact with the other brake pad operatively associated with the more restricted piston or even the caliper body. If the deflection of the disc is enough to cause the less restricted piston to slip forward in the seal beyond the seal retraction, eventually, upon depressurization of the master cylinder, the pad of the less restricted piston will remain in contact with the disc, causing unnecessary friction and perhaps a bothersome noise to the rider.

Conventional bicycle disc brakes have evolved from motor vehicle disc brake systems and are essentially miniaturized versions thereof with few operational modifications. The problem of a brake pad rubbing a disc is not a significant problem for motor vehicle disc brakes, primarily because a motor vehicle has ample driving power from the motor to overcome the attendant frictional losses and any noise generated by the contact is relatively far away from motor vehicle operator and furthermore, any noise is masked by the operational noise of the vehicle. In addition, motor vehicles typically have comparatively rigid discs. As used herein, a "rigid disc" means a disc that does not flex enough when contacted by a pad of a less restricted piston to allow the less restricted piston to slip forward without the other piston releasing.

The present disclosure is intended to overcome one or more of the problems discussed above.

SUMMARY OF THE EMBODIMENTS

A first aspect is a bicycle hydraulic disc brake having opposing caliper pistons riding in a pair of opposing caliper cylinders, each caliper piston being configured to advance a brake pad operatively associated therewith into contact with a disc operatively received therebetween upon delivery of pressurized hydraulic fluid to the respective opposing caliper cylinders. A pair of cylinders is provided, with each cylinder being in fluid communication solely with a distinct one of the opposing caliper cylinders. Upon pressurization of the cylinders, each cylinder of the pair of cylinders provides an equal volume of pressurized hydraulic fluid to the caliper cylinder in fluid communication with the one of the pair of cylinders. An actuator is provided in operative association with each of the pair of cylinders to simultaneously pressurize each of the pair of cylinders and thereby provide an equal volume of pressurized hydraulic fluid to the associated caliper cylinder and thus drive the pistons received in the cylinders and the associated brake pads an equal distance. In one embodiment the actuator comprises a hand operated lever and a linkage between the lever and a piston received in each of the pair of cylinders. Upon actuation of the lever each piston is advanced an in equal distance to thereby provide the equal volume of hydraulic fluid to the caliper cylinders.

Another aspect is a bicycle hydraulic disc brake having opposing caliper pistons riding in a pair of opposing caliper cylinders. Each caliper piston is configured to advance a brake pad operatively associated therewith into contact with a disc operatively received therebetween upon delivery of pressurized hydraulic fluid to the respective opposing caliper cylinders. A master cylinder is configured, upon actuation, to deliver pressurized hydraulic fluid to the caliper cylinders. An equalizer is provided in fluid communication with the caliper cylinders, the equalizer being configured to provide an equal volume of pressurized hydraulic fluid to each caliper cylinder upon actuation of the master cylinder The various aspects may further include a flexible disc operatively received between the brake pads. The aspects may further include the caliper being configured for fixed attachment to a bicycle frame.

Another aspect is a method of actuating a bicycle hydraulic disc brake. The method comprises providing a braking disc and providing a caliper having opposing pistons riding in a pair of opposing caliper cylinders. Each caliper piston is configured to advance a brake pad operatively associated therewith into contact with a braking disc operatively received between the brake pads upon delivery of pressurized hydraulic fluid to the respective opposing caliper cylinders. An equal volume of hydraulic fluid is simultaneously delivered to each caliper cylinder.

DETAILED DESCRIPTION

Figure 1:
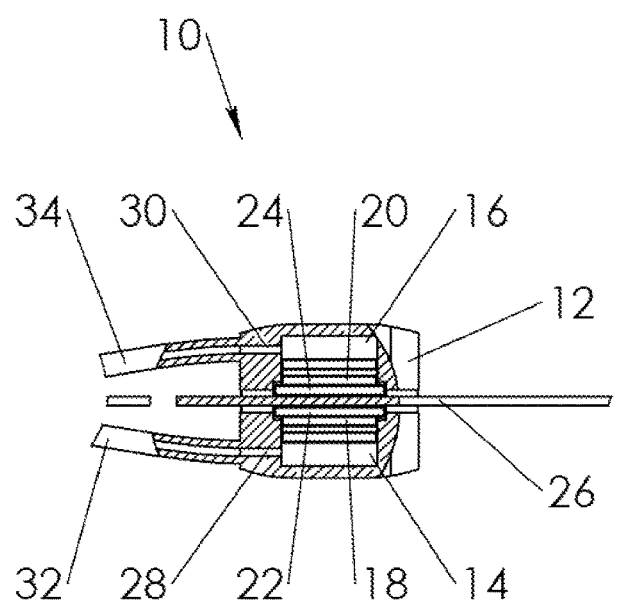
FIG. 1 is a schematic representation of a partially cut away hydraulic disc brake caliper operatively associated with a flexible disc.

FIG. 1 is a schematic representation of a partially cut away embodiment of a caliper 10 of a hydraulic bicycle disc brake having regulated hydraulic fluid flow to opposing cylinders of a caliper. The caliper 10 consists of a caliper body 12 defining an opposing left caliper cylinder 14 and right caliper cylinder 16. A left caliper piston 18 rides in the left caliper cylinder and a right caliper piston 20 rides in the right caliper cylinder 16. A left brake pad 22 is operatively associated with the left caliper piston 18 and a right brake pad 24 is operatively associated with the right caliper piston. A flexible disc 26 is portrayed in operative association with the caliper between the left and right brake pads 22, 24. A bore 28 in the housing provides for fluid communication between an exterior of the housing and the left caliper cylinder 16 and a bore 30 likewise provides fluid communication between the right caliper cylinder 16 and an exterior of the caliper housing. A first hydraulic hose 32 communicates with the bore 28 and a second hydraulic hose 34 communicates with the bore 30.

An embodiment a master cylinder 40 comprises a pair of cylinders 42, 44 with a piston 46 being configured to travel within the cylinder 42 and a piston 48 configured to travel within the piston 44. A linkage 50 is connected to each of the pistons 46, 48. The linkage 50 is operatively associated with an actuator, which may be a hand operated lever depicted schematically as 52. The cylinder 42 is in hydraulic communication with a second hydraulic hose 34 and the cylinder 44 is in fluid communication with the first hydraulic hose 32.

During actuation of the master cylinder 40 by the hand lever 52 the linkage 50 is moved in the direction of the arrow 54 to pressurize hydraulic fluid in the cylinders 42, 44. This in turn pressurizes fluid in the hydraulic hoses 34, 32 which in turn pressurizes the cylinders 14, 16 to advance the pads 22, 24 attached to the pistons 18, 20 into contact with the disc 26. Because the linkage 50 advances each of the pistons 44, 46 in equal distance linearly within the cylinders 42, 44 (which are of identical dimensions), an equal volume of hydraulic fluid is provided to the left caliper cylinder 14 and the right caliper cylinder 16 which will necessarily advance the pistons 18, 20 at the same rate, at the same time, with the same force and for the same linear distance regardless of any interference resulting from factors which might inhibit movement of the pistons 18, 20. Thus, the combination of the linkage 50, the pistons 46, 48 and the cylinders 42 and 44 act as an "equalizer". As a result, the brake pads 22, 24 can be brought into simultaneous contact with the flexible disc 26 without causing significant deflection of the disc 26.

"Significant" deflection means enough deflection that the disc stays in contact with one of the pads once the brake is released.

Figure 2:
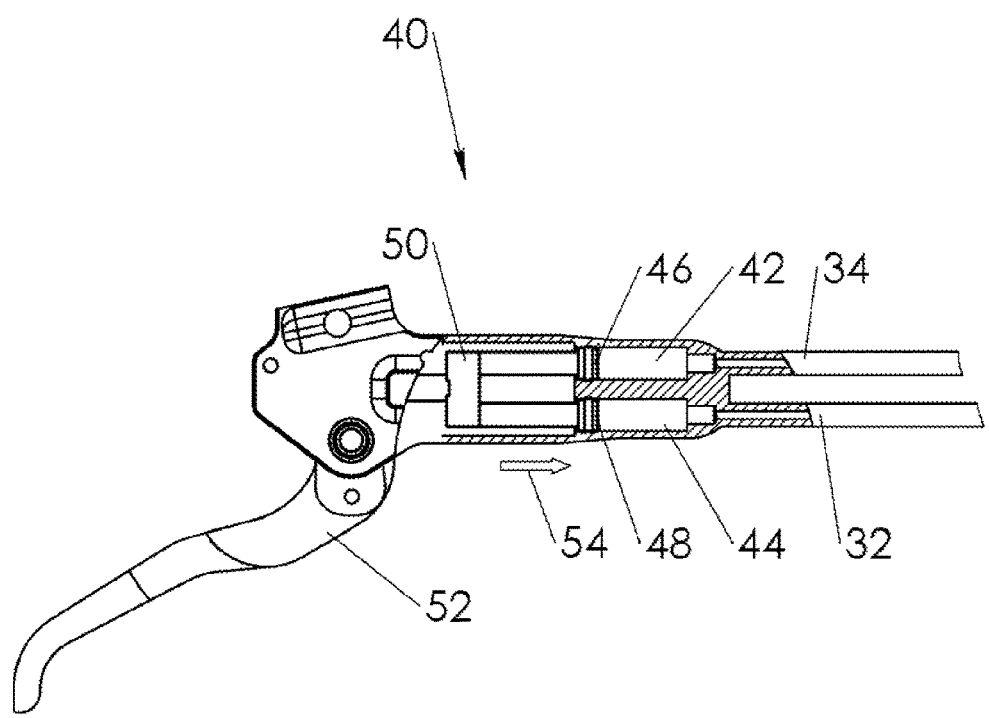
FIG. 2 is a schematic representation of a dual cylinder master cylinder having discrete fluid circuits configured to provide an equal volume of pressurized hydraulic fluid to each of the opposing pair of caliper cylinders of FIG. 1.

Upon release of the lever 52 a spring (not shown) in the lever housing biases the lever 52 to an unactuated position and further acts to move the pistons 46, 48 to the left within the cylinders 42, 44 as depicted in FIG. 2. This draws an identical volume of fluid from each of the caliper cylinders 14, 16 and thus retracts the pads 22, 24 equal distances from the flexible disc. The retraction of the pads is also assisted by an elastic rebound of seals between the pistons 18, 20 and the caliper cylinders 14, 16.

Other embodiments for delivering equal amounts of hydraulic fluid to the left and right caliper cylinders 14, 16 are intended to be within the scope of this disclosure. For example, an equalizer in the form of an apportioning valve (s) could be disposed between the hydraulic hoses 32, 34 and a conventional hydraulic master cylinder 62 to positively apportion equal amounts of hydraulic fluid to the cylinders 14, 16. Other embodiments of a 2-cylinder master cylinder 40 are also contemplated, such as one having the cylinders in series as opposed to being in parallel as depicted in FIG. 2. An essential feature of any of these alternative embodiments is that equal amounts of fluid is delivered to each of the opposing cylinders of the caliper and there is no possibility of the fluid being diverted (i.e., cross-over associated with conventional single hose hydraulic brakes) so that one of the pistons 18, 20 may advance or retract further than the other relative to a disc received therebetween.

A hydraulic bicycle disc brake having twin discrete fluid circuits providing equal volumes of hydraulic fluid flow to opposing cylinders of a caliper assures that each of the opposing pistons will advance an equal amount when actuated and retract an equal amount when released. This equal advancement eliminates the risk of one of the pistons extending further than the other, resulting in deflection of a disc deployed therebetween and possible flexing of the disc into contact with the brake pad when the brake lever is released. This equal advancement also minimizes the risk of excessive pad wear of a first contacting pad and the resulting advance of the first contacting brake pad relative to a piston seal into contact with the disc even upon release of the brake lever. This equal advancement, and the corresponding equal retraction of the brake pads therefore eliminates a potential source of friction which both diminishes efficiency of the bicycle and may create an undesirable noise.

It should be noted that use of the embodiment of a master cylinder 40 depicted in FIG. 2 allows use of cylinders 14, 16 having one half the cross-sectional area of a single cylinder, and the hoses 32, 34 can each have one half the internal cross-sectional area of a standard hydraulic fluid hose. The smaller diameter of the hydraulic fluid hoses makes it relatively easy to combine the fluid hoses into a single assembly perhaps having a FIG. 8 cross-section which can be readily routed along the frame of a bicycle. These features thus help minimize the size and weight of the master cylinder and hydraulic fluid hoses.

Various embodiments of the disclosure could also include permutations of the various elements recited in the claims as if each dependent claim was multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A bicycle hydraulic disc brake comprising:
   a caliper having opposing caliper pistons riding in a pair of opposing caliper cylinders, each caliper piston being configured to advance a brake pad operatively associated therewith into contact with a disc operatively received therebetween upon delivery of pressurized hydraulic fluid to the respective opposing caliper cylinders;
   a pair of cylinders, each cylinder being in fluid communication solely with a distinct one of the opposing caliper cylinders, wherein upon pressurization, each cylinder of the pair of cylinders provides an equal volume of pressurized hydraulic fluid to the caliper cylinder in fluid communication with each cylinder; and
   an actuator operatively associated with each of the pair of cylinders to simultaneously pressurize each of the pair of cylinders by driving an associated pair of pistons received in the pair of cylinders an equal distance.

2. The bicycle hydraulic disc brake of claim 1 wherein the actuator comprises a hand operated lever and a linkage between the lever and each of the pair of pistons received in the pair of cylinders, wherein upon actuation of the lever each of the pair of pistons is advanced an equal distance by an equal force to pressurize each of the cylinders and thereby provide the equal volume of hydraulic fluid to each of the caliper cylinders.

3. The bicycle hydraulic disc brake of claim 1 wherein the actuator retracts the brake pads operatively associated therewith an equal distance by transferring an equal volume of hydraulic fluid from each caliper cylinder toward each of the pair of cylinders.

4. The bicycle hydraulic disc brake of claim 3 wherein the equal distance is sufficient to prevent pad contact with a disc operatively received between the brake pads.

5. The bicycle disc brake of claim 1 further comprising a flexible disc operatively received between the brake pads.

6. The bicycle hydraulic disc brake of claim 1 further comprising the caliper being configured for fixed attachment to a bicycle frame.

* * * * *